(No Model.)
A. W. THOMAS.
WHEEL TIRE.
No. 399,356. Patented Mar. 12, 1889.
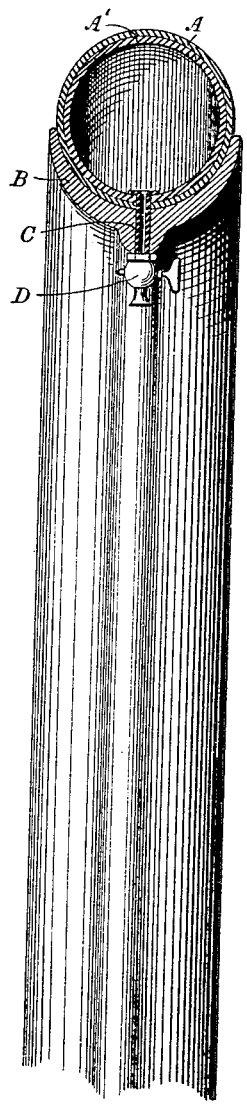
WITNESSES:
INVENTOR.

United States Patent Office.

AMOS W. THOMAS, OF PHILADELPHIA, PENNSYLVANIA.

WHEEL-TIRE.

SPECIFICATION forming part of Letters Patent No. 399,356, dated March 12, 1889.

Application filed June 30, 1888. Serial No. 278,641. (No model.)

*To all whom it may concern:*

Be it known that I, AMOS W. THOMAS, a citizen of the United States, residing at the city of Philadelphia, in the county of Philadelphia and State of Pennsylvania, have invented certain new and useful Improvements in Tires for the Wheels of Vehicles, of which the following is a specification.

My invention relates to tires composed of compressible or elastic material as opposed to metal and such as are capable of being inflated by air, gas, water, or other aeriform or gaseous fluid or liquid.

My invention is, in general, applicable to the road-wheels of carriages or other rolling conveyances, but, however, more especially applicable to the road-wheels of bicycles, tricycles, and velocipedes of all varieties.

The principal object of my present invention is to render such a tire more flexible and likewise more readily compressible in its passage over irregularities in the roadway, while at the same time strong, durable, and serviceable.

My invention consists of two or more concentric tubes, made of elastic or compressible material, fitting closely to and lying or nested within each other, but not secured together, and so arranged that each tube may be capable of an independent "creeping" movement with respect to its neighbor. These results may be accomplished by constructing the tire of tubular form and composed of two or more tubes of rubber, leather, treated fabric, or other suitable material, with, by preference, the outer tube made of tougher material than the inner tube or tubes, and especially the tread portion thereof. The inner tube of the series, made of an impervious material, should be perfectly fluid-tight.

In the accompanying drawing I have illustrated a tire embodying the characteristic features of my invention, in transverse section, as applied to a groove-faced metal felly of the character employed in bicycles and other analogous rolling conveyances, a portion of the felly having been shown partly in section and in elevation.

Referring to the drawing, A is the outer tube, made of rubber or other suitable material of a tough nature, and preferably having the tread portion in its manufacture made tougher than the portion facing the felly.

A' is the inner tube, made of similar material, which in this instance together compose the tire, the interior diameter of the outer tube being the same as the exterior diameter of the inner tube, whereby when they are entered one within the other they will lie closely together without any interspace.

As stated, more than two tubes may be employed, if desired, and to partly or wholly secure the tubes together—for instance, by cement or other glutinous or adhesive material—although I prefer that they should be independent, in order that each tube may be free to creep independently of the other—that is to say, one tube within another.

The tire as a whole is secured to the felly B by being sprung into a groove formed in the outer face of the felly; or it may be secured solidly therein by means of cement or other glutinous or adhesive material.

In order to inflate the tire after having been secured to place in the grooved felly B, a tube, C, with a cock, D, may be fitted into the felly and passed through into the interior of the inner tube, A', of the tire of impervious material made fluid-tight, and the liquid or fluid employed for the inflation thereof forced in the same through the tube by opening the stop-cock D, thereby maintaining a cylindriform contour of the tire for an indefinite period. The degree of compressibility may be regulated by the degree of inflation or the tension of the inflating medium, which, however, may be introduced under pressure.

Various materials may be employed for the formation of the tubes constituting the tire—such, for instance, as leather, woven or textile fabrics suitably treated for rendering them impervious to liquids or fluids; but I prefer to form them of rubber, because of its adaptability for the purpose, and also from the standpoint of cheapness or economy.

The particular advantage incident to the use of such a tire, in addition to being tough and durable, is that it is exceptionally flexible, and hence in use less liable to be cut by contact with stones or other projections of the roadways, and, moreover, it is capable of better withstanding friction, abrasion, and rough usage of wear, to which such tires are subjected, especially in their application to the road-wheels of bicycles, tricycles, or velocipedes in their several varieties.

Having thus described the nature and objects of my invention, what I claim as new, and desire to secure by Letters Patent, is—

1. An inflated tire composed of two or more tubes closely fitted or nested within each other, substantially as and for the purposes set forth.

2. An inflated tire composed of two or more tubes closely fitted into or nested within each other and free to creep the one with respect to the other, substantially as described.

3. An inflated tire composed of two or more tubes closely fitted into or nested within each other, and the outer tube made wholly or in part of tougher material than the inner tube or tubes, substantially as described.

In witness whereof I have hereunto set my signature in the presence of two subscribing witnesses.

AMOS W. THOMAS.

Witnesses:
W. A. WHITMORE,
GEO. W. REED.